(12) United States Patent
Munro et al.

(10) Patent No.: US 11,203,651 B2
(45) Date of Patent: Dec. 21, 2021

(54) METHOD OF DETERMINING A RELATIVE DECREASE IN CATALYTIC EFFICACY OF A CATALYST IN A CATALYST SOLUTION

(71) Applicant: Univation Technologies, LLC, Houston, TX (US)

(72) Inventors: Ian M. Munro, Freeport, TX (US); C. Jeff Harlan, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 210 days.

(21) Appl. No.: 16/617,390

(22) PCT Filed: Jun. 1, 2018

(86) PCT No.: PCT/US2018/035538
§ 371 (c)(1),
(2) Date: Nov. 26, 2019

(87) PCT Pub. No.: WO2018/222955
PCT Pub. Date: Dec. 6, 2018

(65) Prior Publication Data
US 2021/0122846 A1    Apr. 29, 2021

Related U.S. Application Data

(60) Provisional application No. 62/514,388, filed on Jun. 2, 2017.

(51) Int. Cl.
*C08F 10/14* (2006.01)
*G01N 25/48* (2006.01)
(Continued)

(52) U.S. Cl.
CPC ............... *C08F 10/14* (2013.01); *C08F 2/06* (2013.01); *C08F 4/76* (2013.01); *G01N 25/48* (2013.01)

(58) Field of Classification Search
None
See application file for complete search history.

(56) References Cited

U.S. PATENT DOCUMENTS 5,514,728 A * 5/1996 Lamanna ............... C07F 5/027
522/31
6,703,246 B1 * 3/2004 Miller .................. G01N 25/482
374/31

(Continued)

FOREIGN PATENT DOCUMENTS

| JP | 2009210492 | | 9/2009 |
| JP | 2009210492 A | * | 9/2009 |
| WO | 01/02843 | | 1/2001 |

OTHER PUBLICATIONS

International Preliminary Report on Patentability for related PCT Application PCT/US2018/035538, dated Dec. 12, 2019 (9 pgs).

(Continued)

*Primary Examiner* — Richard A Huhn
(74) *Attorney, Agent, or Firm* — Brooks, Cameron & Huebsch, PLLC

(57) ABSTRACT

The present disclosure provides a method of determining a relative decrease in catalytic efficacy of a catalyst in a test sample of a catalyst solution with unknown catalytic activity. The method includes (a) mixing the test sample with a test solvent to form a test mixture and (b) measuring the increase in the temperature of the test mixture at predetermined time intervals immediately after forming the test mixture. A predetermined feature is used to determine both a test value in the increase in temperature measured in (b) and a control value in a known increase in temperature of a control mixture of the test solvent with a control sample of a control catalyst solution. The relative decrease in catalytic efficacy of the catalyst in the test sample having the unknown catalytic activity is then determined from: Relative (Continued)

Decrease in Catalytic Efficacy=Control Value−Test Value/ Control Value.

11 Claims, 1 Drawing Sheet

(51) Int. Cl.
*C08F 2/06* (2006.01)
*C08F 4/76* (2006.01)

(56) References Cited

U.S. PATENT DOCUMENTS

| | | |
|---|---|---|
| 2013/0059390 A1 | 3/2013 | Boast |
| 2016/0220955 A1 | 8/2016 | Ozawa |
| 2017/0022309 A1 | 1/2017 | Vanderlende et al. |

OTHER PUBLICATIONS

International Search Report & Written Opinion for related PCT Application PCT/US2018/035538, dated Oct. 22, 2018 (16 pgs).

\* cited by examiner

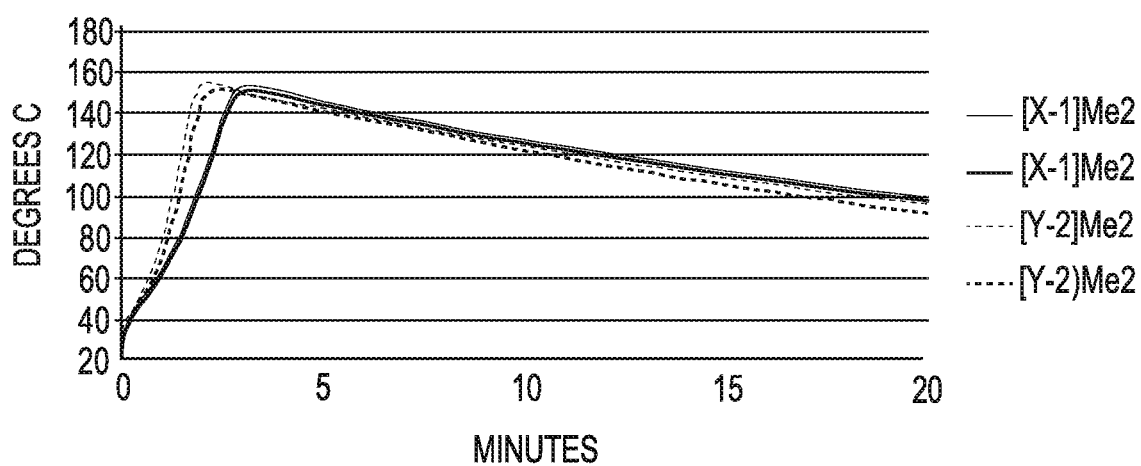

METHOD OF DETERMINING A RELATIVE DECREASE IN CATALYTIC EFFICACY OF A CATALYST IN A CATALYST SOLUTION

This application is a National Stage Application under 35 U.S.C. § 371 of International Application Number PCT/US2018/035538, filed Jun. 1, 2018 and published as WO 2018/222955 on Dec. 6, 2018, which claims the benefit to U.S. Provisional Application 62/514,388, filed Jun. 2, 2017, the entire contents of which are incorporated herein by reference in its entirety

FIELD

Embodiments of the present disclosure are directed to a catalyst solution, more specifically are directed to determining a relative decrease in catalytic efficacy of a catalyst in a catalyst solution.

BACKGROUND

Catalyst solutions are used in producing multimodal polymer products in gas phase polymerization reactors. Once prepared, catalyst solutions can remain in inventory for a long time prior to their use. As such, there can be uncertainty as to whether the catalyst in the catalyst solution has retained its original catalytic efficacy. As such, there is a need in the art for determining the relative catalytic efficacy of a catalyst solution prior to its use in polymer production.

SUMMARY

The present disclosure provides for a method of determining the relative catalytic efficacy of a catalyst solution prior to its use in polymer production. The method relies upon reaction calorimetry, which quantitatively verifies the polymerization efficacy of the catalyst solution relative a control catalyst solution.

The present disclosure is directed to a method of determining a relative decrease in catalytic efficacy of a catalyst in a test sample of a catalyst solution in which the catalyst in the catalyst solution has an unknown catalytic activity. The method includes (a) mixing the test sample with a test solvent to form a test mixture, where the test solvent has predetermined amounts of both an alpha-olefin (e.g., 1-octene) and an activator, and where the alpha-olefin exothermically polymerizes in the presence of the activator and the catalyst to increase a temperature of the test sample. The method further includes (b) measuring the increase in the temperature of the test mixture at predetermined time intervals immediately after forming the test mixture. The method next includes (c) determining a test value of a predetermined feature in the increase in temperature measured in (b). The method also includes (d) determining a control value of the predetermined feature in a known increase in temperature of a control mixture of the test solvent with a control sample of a control catalyst solution measured over the predetermined time intervals immediately after forming the control mixture. Unlike the test sample, the catalyst in the control sample has a known catalytic activity. Both the test sample and the control sample have the same predefined volume and predetermined weight percent of the catalyst. The method then (e) determines the relative decrease in catalytic efficacy of the catalyst in the test sample having the unknown catalytic activity from the equation:

$$\text{Relative Decrease in Catalytic Efficacy} = \frac{\text{Control Value} - \text{Test Value}}{\text{Control Value}}.$$

In one embodiment, the predetermined feature is a maximum temperature value reached during the increase in temperature over the predetermined time intervals. In another embodiment, the predetermined feature is a rate of temperature increase over a set time interval during the predetermined time intervals. In an additional embodiment, measuring the increase in temperature in (b) and measurements for the known increase in temperature of the control mixture from (d) are done under adiabatic conditions.

In one embodiment, the test catalyst solution for the test sample includes 1 weight percent of the catalyst based on the total weight of the test catalyst solution. For the various embodiments, the catalyst can be a metallocene catalyst. Specifically, the metallocene catalyst can be selected from the group consisting of:

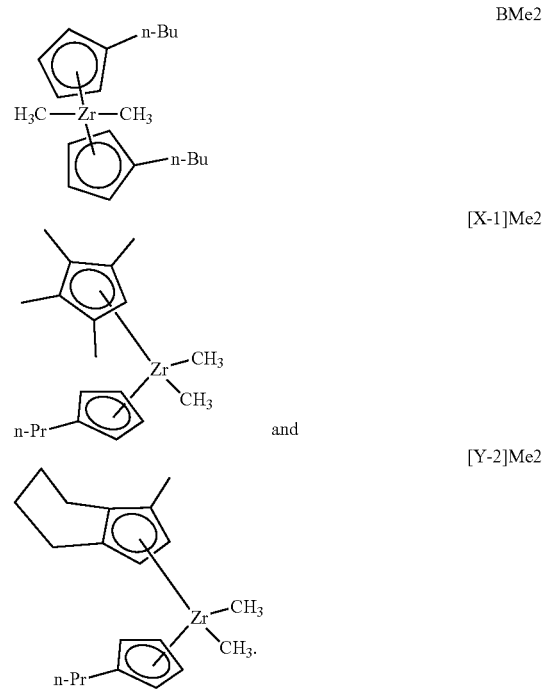

The activator is selected from the group consisting of modified methyl aluminoxane (MMAO), bis(hydrogenated tallow alkyl)methyl, tetrakis(pentafluorophenyl)borate(1-) amine (RIBS-2), triethyl aluminum (TEAL), and combinations thereof. For the embodiments, the alpha-olefin is a C4 to C12 alpha-olefin. In one embodiment, the alpha-olefin is 1-octene.

For any of the embodiments described herein, the catalyst solution can be a trim solution.

The present disclosure also includes a method of trimming a polymerization reaction in a polymerization reactor. This method includes determining a relative decrease in catalytic efficacy of a catalyst in a test sample of a trim solution in which the catalyst has an unknown catalytic activity. The method further includes determining, based on the change in catalytic efficacy, an increased amount of the trim solution to trim the polymerization reactor relative to an amount of control trim solution having a known catalytic activity, and introducing the increased amount of the trim solution into the polymerization reactor. In one embodiment, the increased amount of the trim solution increases relative to the amount of control trim solution to mitigate the decreased catalyst efficacy and provide an effective catalyst efficacy equal to the known catalytic activity.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF DRAWINGS

FIG. 1 is a graph showing changes in temperature of test mixtures and control mixtures used in determining the relative catalytic efficacy of catalysts in catalyst solutions according to the present disclosure.

DETAILED DESCRIPTION

The present disclosure provides for a method of determining the relative catalytic efficacy of a catalyst solution prior to its use in polymer production. The method relies upon reaction calorimetry, which quantitatively verifies the polymerization efficacy of the catalyst solution relative a control catalyst solution.

As used herein, "catalytic efficacy" is defined as the ability of a catalyst in a catalyst solution to achieve its intended or indicated catalytic activity. The intended or indicated catalytic activity is known at the time of preparing a catalyst solution, but over time (e.g., days, weeks or months) during which the catalyst solution is stored the catalytic activity of the catalyst in the catalyst solution can change (e.g., decrease), thereby becoming unknown. As discussed herein, the catalytic efficacy of the catalyst solution having the catalyst with the unknown catalytic activity is determined by measuring its catalytic activity through reaction calorimetry against a control catalyst solution under identical conditions (chemical and physical), where the catalytic activity of the catalyst in the control catalyst solution is known. From these measurements, a relative decrease in catalytic efficacy of the catalyst in the catalyst solution having the unknown catalytic activity is determined relative the control catalyst solution in which the catalytic activity of the catalyst is known.

So, the present disclosure is directed to a method of determining a relative decrease in catalytic efficacy of a catalyst in a test sample of a catalyst solution in which the catalyst in the catalyst solution has an unknown catalytic activity. The method includes (a) mixing the test sample with a test solvent to form a test mixture, where the test solvent has predetermined amounts of both an alpha-olefin (e.g., 1-octene) and an activator, and where the alpha-olefin exothermically polymerizes in the presence of the activator and the catalyst to increase a temperature of the test sample. The method further includes (b) measuring the increase in the temperature of the test mixture at predetermined time intervals immediately after forming the test mixture.

The method next includes determining a test value of a predetermined feature in the increase in temperature measured in (b). The method also includes determining a control value of the predetermined feature in a known increase in temperature of a control mixture of the test solvent with a control sample of a control catalyst solution measured over the predetermined time intervals immediately after forming the control mixture. Unlike the test sample, the catalyst in the control sample has a known catalytic activity. Both the test sample and the control sample have the same predefined volume and predetermined weight percent of the catalyst. The method then determines the relative decrease in catalytic efficacy of the catalyst in the test sample having the unknown catalytic activity from the equation:

$$\text{Relative Decrease in Catalytic Efficacy} = \frac{\text{Control Value} - \text{Test Value}}{\text{Control Value}}.$$

For any of the embodiments described herein, the catalyst solution can be a trim solution. Trim solutions are utilized in polyolefin polymerization processes that react an olefin, such as ethylene discussed herein, and at least one co-monomer with a bimodal catalyst system to produce a multimodal polyolefin polymer. The bimodal catalyst systems for such multimodal polyolefin polymerization processes include a first catalyst that promotes polymerization of the ethylene into a low molecular weight (LMW) portion of the multimodal polyolefin polymer and a second catalyst that promotes polymerization of the ethylene into a high molecular weight (HMW) portion of the multimodal polyolefin polymer.

Depending upon the desired properties of the multimodal polyolefin polymer at least a portion of either the first catalyst or the second catalyst is added via the trim solution to the catalyst system. Specifically, the trim solution is used with the bimodal catalyst system to control the "split" (e.g., the relative amounts of the LMW and the HMW portions) between the LMW and the HMW fractions of the multimodal polyolefin polymer, where such control can help to tailor specific properties of the multimodal polyolefin polymer. For example, the melt flow ratio (MFR) of the multimodal polyolefin polymer is a property that can be controlled using a trim solution. Examples of such polyolefin polymerization processes that utilize a trim solution are found in WO 2015/123177 entitled "Producing Polyolefin Products" to VanderLende et al., among other references.

The catalyst solution can be prepared by dissolving the catalyst (and optional activator) in a liquid solvent. The liquid solvent may be a saturated or aromatic hydrocarbon. The liquid solvent may be an alkane, such as a C5 to C30 alkane, or a C5 to C10 alkane. Cyclic alkanes such as cyclohexane and aromatic compounds such as toluene may also be used as the liquid solvent. In addition, mineral oil may be used as the liquid solvent, where mixtures of mineral oil and an alkane, as discussed herein, can also be used as the liquid solvent. The liquid solvent employed should be liquid under the conditions of polymerization and relatively inert.

In various embodiments, the catalyst is present in the catalyst solution at up to about 90 weight percent (wt. %), at up to about 50 wt. %, at up to about 20 wt. %, at up to about 10 wt. %, at up to about 5 wt. %, up to 1 wt. %, or between 100 ppm and 1 wt. %, where the weight percent is based on the total weight of the catalyst solution. The liquid solvent makes up the remaining weight percent of the catalyst solution. In one embodiment, the test catalyst solution for the test sample includes 1 weight percent of the catalyst and 99 weight percent of liquid solvent based on the total weight of the test catalyst solution. If the catalyst solution includes both an activator and the catalyst, the ratio of metal in the activator to metal in the catalyst in the catalyst solution can be 1000:1 to 0.5:1, 300:1 to 1:1, or 150:1 to 1:1.

Examples of the catalyst for a catalyst solution include metallocene and non-metallocene (e.g., Group 15 atom) catalysts, as discussed herein. The catalyst solution may further include an activator in addition to the catalyst. In addition, the catalyst solution may include two or more catalysts.

Metallocene catalysts include "half sandwich" and/or "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) may include atoms from the group of Groups 13 to 16 atoms. For instance, atoms that make up the Cp ligands can be from the group of carbon, nitrogen, oxygen, silicon, sulfur, phosphorous, germanium, boron, aluminum, and combinations thereof, where carbon makes up at least 50% of the ring members. In one embodiment, the Cp ligand(s) are from the group of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof, e.g., 4,5,6,7-tetrahydroindenyl, or "H4 Ind", substituted versions thereof, and heterocyclic versions thereof.

The metal atom "M" of the metallocene catalyst can be selected from Groups 3 through 12 atoms and lanthanide Group atoms; and one embodiment provides "M" is selected from Groups 3 through 10 atoms, e.g., "M" can be selected from Sc, Ti, Zr, Hf, V, Nb, Ta, Mn, Re, Fe, Ru, Os, Co, Rh, Ir, and Ni. "M" can be selected from Groups 4, 5, and 6 atoms, e.g., "M" can be selected from Ti, Zr, Hf atoms. The oxidation state of the metal atom "M" can range from 0 to +7. For instance, the oxidation state of "M" can be 0, +1, +2, +3, +4, +5, +6, or +7. The groups bound to the metal atom "M" are electrically neutral, unless otherwise indicated. The Cp ligand can form at least one chemical bond with the metal atom "M" to form the metallocene catalyst. The Cp ligands are distinct from the leaving groups bound to the metallocene catalyst, e.g., they are not highly susceptible to substitution/abstraction reactions.

The metallocene catalyst can be represented by Formula (I):

$$Cp^A Cp^B MX_n$$ Formula (I)

where M is as described above; each X is chemically bonded to M; each Cp group is chemically bonded to M; and n is 0 or an integer from 1 to 4. One or more embodiments provide that n is 1 or 2.

The ligands represented by $Cp^A$ and $Cp^B$ in formula (I) can be the same or different cyclopentadienyl ligands or ligands isolobal to cyclopentadienyl, either or both of which can independently contain or not contain heteroatoms and either or both of which can be unsubstituted or substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Examples of metallocene catalysts, as are known in the art, are provided in, for example, PCT Publication WO 2015/123177 entitled "Producing Polyolefin Products" to VanderLende et al., and US 2017/0081432 entitled "Preparation of Polyolefin" to Lester et al., both of which are incorporated herein by reference in their entirety.

The metallocene catalyst can include from 0.0.01 wt. % to 4 wt. % of a transition metal based upon a total weight of the metallocene catalyst. All individual values and subranges from 0.01 wt. % to 4 wt. % are included; for example, the metallocene catalyst can include from a lower limit of 0.01 wt. %, 0.2 wt %, 0.3 wt. %, 0.5 wt. %, or 0.7 wt. % to an upper limit of 1.0 wt. %, 2.0 wt. %, 2.5 wt. %, 3.0 wt. %, 3.5 wt. %, or 4.0 wt. % of a transition metal based upon the total weight of the metallocene catalyst.

The metallocene catalyst can include any combination of any embodiment incorporated, discussed and/or described herein. For example, the metallocene catalyst can include, but is not limited to, bis(n-propylcyclopentadienyl) hafnium $(CH_3)_2$, bis(n-propylcyclopentadienyl) hafnium $F_2$, bis(n-propylcyclopentadienyl) hafnium C12, or bis(n-butyl, methyl cyclopentadienyl) zirconium C12, or combinations thereof. Further metallocene catalysts are discussed in WO 2015/123166, which is incorporated herein by reference in its entirety. Specific examples of metallocene include those selected from the group consisting of:

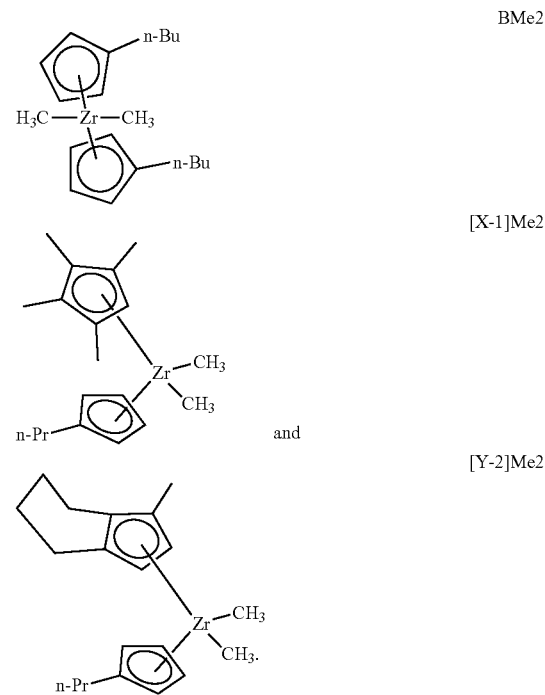

Examples of non-metallocene catalysts (e.g., Group 15 atom) generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

Specific examples of non-metallocene catalysts (e.g., vanadium based catalysts, titanium based Ziegler-Natta catalysts, chromium and chromium oxide based catalyst compositions), as are known in the art, are provided in, for example, PCT Publication WO 2015/123177 entitled "Producing Polyolefin Products" to VanderLende et al., and US 2017/0081432 entitled "Preparation of Polyolefin" to Lester et al., both of which are incorporated herein by reference in their entirety.

As mentioned, once prepared or received from the manufacturer, a catalyst solution can remain in inventory for some period of time (e.g., days, weeks or months) prior to its use. As such, there can be uncertainty as to whether the catalyst in the catalyst solution has retained its original catalytic activity. The present disclosure provides a method for determining the relative catalytic efficacy of a catalyst solution prior to its use in polymer production. More specifically, the present disclosure provides a method for determining a relative decrease in catalytic efficacy of a catalyst in a catalyst solution in which the catalyst in the catalyst solution has an unknown catalytic activity.

To determine this relative decrease in catalytic efficacy of the catalyst, a test sample of the catalyst solution in which the catalyst in the catalyst solution has an unknown catalytic activity is mixed with a test solvent to form a test mixture. The volume of the test sample used in forming the test mixture is based on a predetermined molar amount of the catalyst in the catalyst solution being tested. For example, the molar concentration of the catalyst in the catalyst solution as originally formed can be used in determining the volume used in the test sample volume, even though some of the catalyst in the catalyst solution may no longer be active or be only partially active as a catalyst due to effects of its storage.

For the various embodiments, the predetermined molar amount of the catalyst used in forming the test sample of the catalyst solution can be in a range from a low value of 1 μmole; 2 μmoles; 3 μmoles; 4 μmoles or 5 μmoles to an upper value of 10 μmoles; 20 μmoles; 40 μmoles; 50 μmoles or 100 μmoles, where any combination of lower and upper values are possible. For example, the predetermined molar amount of the catalyst used in forming the test sample of the catalyst solution being tested can be in a range from 1 μmole to 100 μmoles; 1 μmole to 50 μmoles; 1 μmole to 40 μmoles; 1 μmole to 20 μmoles; 1 μmole to 10 μmoles; 2 μmoles to 100 μmoles; 2 μmoles to 50 μmoles; 2 μmoles to 40 μmoles; 2 μmoles to 20 μmoles; 2 μmoles to 10 μmoles; 3 μmoles to 100 μmoles; 3 μmoles to 50 μmoles; 3 μmoles to 40 μmoles; 3 μmoles to 20 μmoles; 3 μmoles to 10 μmoles; 4 μmoles to 100 μmoles; 4 μmoles to 50 μmoles; 4 μmoles to 40 μmoles; 4 μmoles to 20 μmoles; 4 μmoles to 10 μmoles; 5 μmoles to 100 μmoles; 5 μmoles to 50 μmoles; 5 μmoles to 40 μmoles; 5 μmoles to 20 μmoles; 5 μmoles to 10 μmoles.

The test solvent used to form the test mixture (and a control mixture as discussed herein) is a mixture of an alpha-olefin (double bond at primary or alpha position) and an activator. The alpha-olefin can be a C4 to C12 alpha-olefin or a mixture of two or more of the C4 to C12 alpha-olefins. In addition, the C4 to C12 alpha-olefin can be linear, branched or a combination thereof. In one embodiment, the alpha-olefin is a C6 to C10 alpha-olefin or a mixture of two or more of the C6 to C10 alpha-olefins. In one embodiment, the test solvent used to form the test mixture is 1-octene (a C8 alpha-olefin).

As used herein, the term "activator" may refer to any compound or combination of compounds, supported, or unsupported, which can activate the catalyst, such as by creating a cationic species on the catalyst. For example, this can include the abstraction of at least one leaving group (the "X" group in the metallocene catalyst described herein) from the metal center of the catalyst. The activator may also be referred to as a "co-catalyst".

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as dimethylanilinium tetrakis(pentafluorophenyl)borate, triphenylcarbenium tetrakis(pentafluorophenyl)borate, dimethylanilinium tetrakis(3,5-$(CF_3)_2$phenyl)borate, triphenylcarbenium tetrakis(3,5-$(CF_3)_2$phenyl)borate, dimethylanilinium tetrakis(perfluoronapthyl)borate, triphenylcarbenium tetrakis(perfluoronapthyl)borate, dimethylanilinium tetrakis(pentafluorophenyl)aluminate, triphenylcarbenium tetrakis(pentafluorophenyl)aluminate, dimethylanilinium tetrakis(perfluoronapthyl)aluminate, triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

One or more organo-aluminum compounds such as one or more alkylaluminum compounds can also be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Preferably, the activator is selected from the group consisting of modified methyl aluminoxane (MMAO), bis(hydrogenated tallow alkyl)methyl, tetrakis(pentafluorophenyl) borate(1-)amine (RIBS-2), triethyl aluminum (TEAL), and combinations thereof.

The test solvent has predetermined amounts of both the alpha-olefin and the activator. With respect to the predetermined amounts, the test solvent can include a molar ratio of moles of the alpha-olefin to moles of the activator in a range from 20,000 to 1 down to 4,000 to 1. Other ranges are possible, such as from 15,000 to 1 down to 4,000 to 1; from 10,000 to 1 down to 4,000 to 1; from 9,000 to 1 down to 4,000 to 1; from 8,000 to 1 down to 4,000 to 1; from 7,000 to 1 down to 4,000 to 1; from 6,000 to 1 down to 4,000 to 1; and from 5,000 to 1 down to 4,000 to 1.

Mixing the test sample of the catalyst solution with the test solvent to form the test mixture can occur at room temperature (23° C.). In addition, upon mixing the test mixture is mechanically stirred through the use of a magnetic stir bar to ensure rapid mixing and uniform heat distribution. Once mixed, the alpha-olefin exothermically polymerizes in the presence of the activator and the catalyst to increase a temperature of the test mixture. A sensor of a thermocouple inserted into the test mixture can be used to measure the increase in the temperature of the test mixture at predetermined time intervals, or continuously, immediately after forming the test mixture. The predetermined time intervals can include uniform intervals having a value in a range from 0.1 second to 10 seconds. Measuring the increase in the temperature of the test mixture at the predetermined time intervals, or continuously, can occur for a length of time sufficient to record a maximum temperature value reached during the increase in temperature over the predetermined time intervals. Recording temperatures beyond the occurrence of the maximum temperature value reached is possible.

In an additional embodiment, measuring the increase in the temperature of the test mixture is done under adiabatic conditions, as described herein. For example, mixing the test sample of the catalyst solution with the test solvent to form the test mixture can occur in a container that has been insulated, where the reaction of the alpha-olefin in the presence of the activator and the catalyst occurs so rapidly that it is assumed there is not enough time for the transfer of energy as heat to take place to or from the insulated container. As such, the amount of heat transferred into or out of the test mixture is minimized and the process is idealized to be adiabatic.

The method next includes determining a test value of a predetermined feature in the increase in temperatures measured in the test mixture at the predetermined time intervals, or continuously, immediately after forming the test mixture. In one embodiment, the predetermined feature is a maximum temperature value reached during the increase in temperature over the predetermined time intervals. In another embodiment, the predetermined feature is a rate of temperature increase over a set time interval during the predetermined time intervals. This later predetermined feature can be determined by selecting at least a portion of the predetermined time intervals over which the rate of temperature increase has a linear or essentially linear increase. Preferably, the portion of the predetermined time intervals over which the rate of temperature increase has a linear or essentially linear increase is taken over a time that represents at least 50 percent of the time period from immediately after forming the test mixture to the when the maximum temperature value is reached during the increase in temperature over the predetermined time intervals.

As discussed herein, the catalytic efficacy of the catalyst solution having the catalyst with the unknown catalytic activity is determined by measuring its catalytic activity through reaction calorimetry and then comparing the results against a control catalyst solution tested under identical conditions (chemical and physical). In order to make a meaningful comparison, the control catalyst solution is chemically identical to the catalyst solution having the catalyst with the unknown catalytic activity, except that the catalytic activity of the catalyst in the control catalyst solution is known based on the specification of its manufacture.

The control catalyst solution is used to prepare what is referred to herein as a "known" increase in temperature from a control mixture of the test solvent, as described herein, with a control sample of the control catalyst solution. The known increase in temperature from the test mixture is prepared in a manner identical to the manner in which the increase in temperatures measured in the control mixture was prepared. Briefly, the control sample having the same predefined volume and predetermined weight percent of the catalyst as the test sample is mixed with the test solvent, as discussed herein, to form the control mixture at room temperature (23° C.). Upon mixing the control mixture is mechanically stirred, as previously discussed, and a thermocouple inserted into the control mixture measures the increase in the temperature of the control mixture at the predetermined time intervals, or continuously, immediately after forming the control mixture.

Measuring the increase in the temperature of the control mixture at the predetermined time intervals, or continuously, occurs for a length of time sufficient to record a maximum temperature value reached during the increase in temperature over the predetermined time intervals. Measuring the increase in the temperature of the control mixture is done under adiabatic conditions, as described herein. As such, measuring the increase in temperature of the test mixture at predetermined time intervals immediately after forming the test mixture and the measurements for the known increase in temperature of the control mixture from the control mixture are both done under adiabatic conditions.

A control value for the predetermined feature in the known increase in temperature of the control mixture of the test solvent with the control sample of the control catalyst solution measured over the predetermined time intervals, or continuously, immediately after forming the control mixture can then be determined as discussed herein with respect to the test mixture. As noted herein, the predetermined feature can be a maximum temperature value reached during the increase in temperature over the predetermined time intervals. In another embodiment, the predetermined feature is the rate of temperature increase over the set time interval during the predetermined time intervals.

The control value and the test value can then be used to determine the relative decrease in catalytic efficacy of the catalyst in the test sample having the unknown catalytic activity from the equation:

$$\text{Relative Decrease in Catalytic Efficacy} = \frac{\text{Control Value} - \text{Test Value}}{\text{Control Value}}.$$

The relative decrease in catalytic efficacy is expressed as a value of 1 or less. Alternatively, the relative decrease in catalytic efficacy can be expressed as a percentage of the control value by multiplying the result of the above equation by 100.

Once calculated, the relative decrease in catalytic efficacy of the catalyst in the test sample can be used in a polymerization reaction in a polymerization reactor, as are known in the art. For example, the relative decrease in catalytic efficacy of the catalyst in the test sample can be used in trimming a polymerization reaction in a polymerization reactor. The method of trimming the polymerization reaction in the polymerization reactor can include determining the relative decrease in catalytic efficacy of the catalyst in the test sample of a trim solution in which the catalyst has an unknown catalytic activity, as discussed herein. The method further includes determining, based on the relative decrease in catalytic efficacy, an increased amount of the trim solution to trim the polymerization reactor relative to an amount of control trim solution having a known catalytic activity. The increased amount of the trim solution can then be introduced into the polymerization reactor. In one embodiment, the increased amount of the trim solution increases relative to the amount of control trim solution to mitigate the decreased catalyst efficacy and provide an effective catalyst efficacy equal to the known catalytic activity.

In an additional example, the relative decrease in catalytic efficacy of the catalyst in the test sample can be used in a polymerization reaction in a polymerization reactor. The method of using the catalyst solution for the polymerization reaction in the polymerization reactor can include determining the relative decrease in catalytic efficacy of the catalyst in the test sample of the catalyst solution in which the catalyst has an unknown catalytic activity, as discussed herein. The method further includes determining, based on the relative decrease in catalytic efficacy, an increased amount of the catalyst solution to use in the polymerization reactor relative to an amount of control catalyst solution having a known catalytic activity. The increased amount of the catalyst solution can then be introduced into the polymerization reactor. In one embodiment, the increased amount of the catalyst solution increases relative to the amount of control catalyst solution to mitigate the decreased catalyst efficacy and provide an effective catalyst efficacy equal to the known catalytic activity.

Examples

Some embodiments of the disclosure will now be described in detail in the following Examples.

Materials:

(Pentamethylcyclopentadienyl)(n-propylcyclopentadienyl)zirconium dichloride (Boulder Scientific Company); white mineral oil (Sigma-Aldrich); a narrow boiling range high-purity isoparaffinic solvent commercially available under the tradename ISOPAR™ C from ExxonMobil Corporation; 1-octene (Sigma-Aldrich); tetrakis(pentafluorophenyl)borate(1-) amine (RIBS-2).

Purify the 1-octene and the ISOPAR™ C with molecular sieves before use.

Catalysts:

The Examples use the following Catalysts:

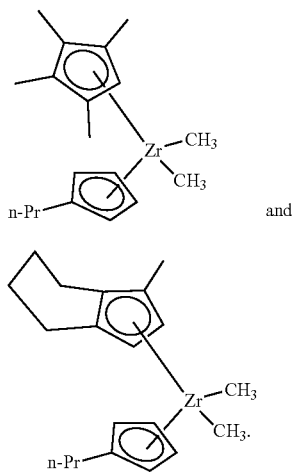

Prepare [X-1]Me2 starting with (pentamethylcyclopentadienyl)(n-propylcyclopentadienyl)zirconium dichloride according to method found in Huang, Rubin et al, Macromolecules (Washington, D.C., United States), 41(3), 579-590; 2008. Prepare [Y-2]Me2 according to method found in WO 2016/168700 A1 to Harlan et al.

Catalyst Solution:

Prepare catalyst solutions at room temperature (23° C.) as follows. Prepare a liquid solvent mixture of mineral oil in degassed ISOPAR™ C.

First Catalyst Solution

Dissolve catalyst [X-1]Me$_2$ in the liquid solvent mixture at room temperature to form a First Catalyst solution having 1 wt. % [X-1]Me$_2$.

Second Catalyst Solution

Dissolve catalyst [Y-2]Me$_2$ in the solvent mixture at room temperature to form a Second Catalyst solution having 1 wt. % [Y-1]Me$_2$.

Control samples of both the First Catalyst solution and the Second Catalyst solution undergo a Temperature Change Test (see below) within 24 hours after being formed. Test Samples of the First Catalyst solution and the Second Catalyst solution are stored at 23° C. for a period of time after being formed before undergoing the Temperature Change Test.

Temperature Change Test

Conduct all reactions an inert-atmosphere (nitrogen) dry box as follows.

Temperature Change Test in Control Sample of First Catalyst Solution

To a 40 milliliter (ml) glass vial having a stir bar add 11 ml of 1-octene, 12 μmoles of RIBS-2 to form a test solvent. Mix enough of the Control Sample of the First Catalyst solution to provide 10 μmoles of [X-1]Me$_2$ in the test solvent to form a control mixture of the First Catalyst solution. Insert the 40 ml glass vial having the control mixture into an insulated sleeve mounted on a magnetic stirrer. Seal the 40 ml glass vial with a septum cap and insert a thermocouple through the cap to a location just below the surface of the control mixture. While stirring the control mixture measure and record a change in temperature of the control mixture from the thermocouple as a function of time (every five (5) seconds) after forming the control mixture until, at minimum, a maximum temperature is reached.

Temperature Change in Control Sample of Second Catalyst Solution

To a 40 milliliter (ml) glass vial having a stir bar add 11 ml of 1-octene, 12 μmoles of RIBS-2 to form a test solvent. Add enough Control Sample of the Second Catalyst solution to provide 10 μmoles of [Y-2]Me$_2$ to the test solvent to form a control mixture of the Second Catalyst solution. Insert the 40 ml glass vial having the control mixture into an insulated sleeve mounted on a magnetic stirrer. Seal the 40 ml glass vial with a septum cap and insert a thermocouple through the cap to a location just below the surface of the control mixture. While stirring the control mixture measure and record a change in temperature of the control mixture from the thermocouple as a function of time (every five (5) seconds) after forming the control mixture until, at minimum, a maximum temperature is reached.

Temperature Change in Test Sample of First Catalyst Solution

Repeat the Temperature Change in Control Sample of the First Catalyst solution procedure with the following changes. Replace the Control Sample of the First Catalyst solution with the Test Sample of the First Catalyst solution.

Temperature Change in Test Sample of Second Catalyst Solution

Repeat the Temperature Change in Control Sample of the Second Catalyst solution procedure with the following changes. Replace the Control Sample of the Second Catalyst solution with the Test Sample of the Second Catalyst solution.

Results

Determine the relative decrease in catalytic efficacy of the catalyst in the Test Samples of the Catalyst solutions as follows. From the recorded change in temperature as a function of time determine a maximum temperature value for the Test Sample and the Control Sample for each of the First Catalyst solution and the Second Catalyst solution. Use the recorded change in temperature to also determine a slope of the rate at which the temperature rises to the maximum temperature for the Test Sample and the Control Sample for each of the First Catalyst solution and the Second Catalyst solution.

FIG. 1 shows the change in temperature for each of the Control Sample of the First Catalyst solution and the Second Catalyst solution and each Test Sample for the First Catalyst solution and the Second Catalyst solution taken as a function of time. As illustrated in FIG. 1, temperature rate curves show a change in the temperature measured for each of the samples, where the change in temperature measured for each of the Test Samples can be compared to the known change in temperature of each of the Control Samples for the First Catalyst solution and the Second Catalyst solution, respectively.

The data for FIG. 1 shows the maximum temperature of the Control Sample of the First Catalyst solution to be 155° C.; the maximum temperature of the Test Sample of the First Catalyst solution to be 151.25° C.; the maximum temperature of the Control Sample of the Second Catalyst solution to be 157.5° C.; and the maximum temperature of the Test Sample of the Second Catalyst solution to be 152.5° C.

FIG. 1 also provides data to determine a rate of temperature increase over a set time interval during the predetermined time intervals. As seen in FIG. 1, this can be determined from a slope of the straightest portions of the temperature rate curves at which the temperature rises to the maximum temperature for the Test Sample and the Control Sample for each of the First Catalyst solution and the Second Catalyst solution. From FIG. 1, the slope of the temperature rate curve at which the temperature changes is take is from 1 minute to 3 minutes for the First Catalyst solution and from 1 minute to 2 minutes for the Second Catalyst solution. The slope for the Control Sample of the First Catalyst solution is 46.25° C./min and the slope for the Test Sample of the First Catalyst solution is 45° C./min. The slope for the Control Sample of the Second Catalyst solution is 77.5° C./min and the slope for the Test Sample of the Second Catalyst solution is 73.75° C./min.

Using the recorded change in temperature of the mixtures from the thermocouple as a function of time discussed above, the relative decrease in catalytic efficacy of the catalyst in the Test Sample is determined based on the equation:

$$\text{Relative Decrease in Catalytic Efficacy} = \frac{\text{Control Value} - \text{Test Value}}{\text{Control Value}}.$$

Using the maximum temperature, the relative decrease in catalytic efficacy of the catalyst in the Test Sample of the First Catalyst solution is 97.6% relative the Control Sample of the First Catalyst solution. Using the slope of the rate of temperature change, the relative decrease in catalytic efficacy of the catalyst in the Test Sample of the First Catalyst solution is 97.3% relative the Control Sample of the First Catalyst solution. Similarly, using the maximum temperature, the relative decrease in catalytic efficacy of the catalyst in the Test Sample of the Second Catalyst solution is 96.8% relative the Control Sample of the Second Catalyst solution. Using the slope of the rate of temperature change, the relative decrease in catalytic efficacy of the catalyst in the Test Sample of the Second Catalyst solution is 95.2% relative the Control Sample of the Second Catalyst solution.

In the case where the catalyst solution is a trim solution, the relative decrease in catalyst efficacy can then be used in trimming a polymerization reaction in a polymerization reactor, where an increased amount of the trim solution to trim the polymerization reactor, relative to an amount of control trim solution having a known catalytic activity, can be determined based on the change in catalytic efficacy. The increased amount of the trim solution can then be introduced into the polymerization reactor so as to mitigate the decreased catalyst efficacy and provide an effective catalyst efficacy equal to the known catalytic activity.

All patents, test procedures, and other documents cited in this application are fully incorporated by reference to the extent such disclosure is not inconsistent with this application and for all jurisdictions in which such incorporation is permitted.

The invention claimed is:

1. A method of determining a relative decrease in catalytic efficacy of a catalyst in a test sample of a catalyst solution in which the catalyst in the catalyst solution has an unknown catalytic activity, the method comprising:
    (a) mixing the test sample with a test solvent to form a test mixture, wherein the test solvent has predetermined amounts of both an alpha-olefin and an activator, and wherein the alpha-olefin exothermically polymerizes in the presence of the activator and the catalyst to increase a temperature of the test sample;
    (b) measuring the increase in the temperature of the test mixture at predetermined time intervals immediately after forming the test mixture;
    (c) determining a test value of a predetermined feature in the increase in temperature measured in (b);
    (d) determining a control value of the predetermined feature in a known increase in temperature of a control mixture of the test solvent with a control sample of a control catalyst solution measured over the predetermined time intervals immediately after forming the control mixture, wherein the catalyst in the control sample has a known catalytic activity and wherein both the test sample and the control sample have the same predefined volume and predetermined weight percent of the catalyst; and
    (e) determining the relative decrease in catalytic efficacy of the catalyst in the test sample having the unknown catalytic activity from the equation:

$$\text{Relative Decrease in Catalytic Efficacy} = \frac{\text{Control Value} - \text{Test Value}}{\text{Control Value}}.$$

2. The method of claim 1, wherein the predetermined feature is a maximum temperature value reached during the increase in temperature over the predetermined time intervals.

3. The method of claim 1, wherein the predetermined feature is a rate of temperature increase over a set time interval during the predetermined time intervals.

4. The method of claim 1, wherein the alpha-olefin is a C4 to C12 alpha-olefin.

5. The method of claim 1, where the catalyst is a metallocene catalyst.

6. The method of claim 5, wherein the metallocene catalyst is selected from the group consisting of

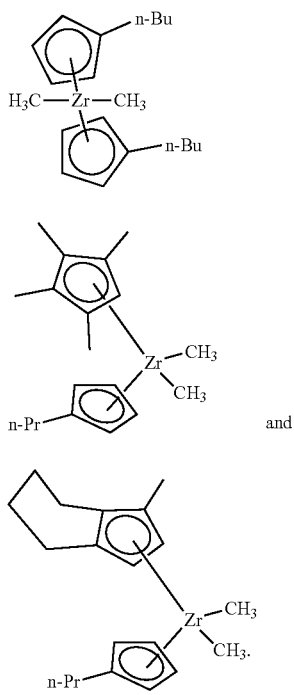

BMe2

[X-1]Me2

[Y-2]Me2

7. The method of claim 1, wherein the activator is selected from the group consisting of modified methyl aluminoxane (MMAO), bis(hydrogenated tallow alkyl)methyl, tetrakis (pentafluorophenyl)borate(l-)amine (RIBS-2), triethyl aluminum (TEAL), and combinations thereof.

8. The method of claim 1, wherein measuring the increase in temperature in (b) and measurements for the known increase in temperature of the control mixture from (d) are done under adiabatic conditions.

9. The method of claim 1, wherein the catalyst solution is a trim solution.

10. A method of trimming a polymerization reaction in a polymerization reactor, the method comprising;
   determining, according to claim 9, a relative decrease in catalytic efficacy of a catalyst in a test sample of a trim solution in which the catalyst has an unknown catalytic activity;
   determining, based on the relative decrease in catalytic efficacy, an increased amount of the trim solution to trim the polymerization reactor relative to an amount of control trim solution having a known catalytic activity; and
   introducing the increased amount of the trim solution into the polymerization reactor.

11. The method of claim 10, wherein the increased amount of the trim solution increases relative to the amount of control trim solution to mitigate the relative decrease in catalytic efficacy and provide an effective catalyst efficacy equal to the known catalytic activity.

* * * * *